United States Patent
Ma et al.

(10) Patent No.: US 10,603,586 B2
(45) Date of Patent: Mar. 31, 2020

(54) VOICE COMMUNICATION METHOD AND SYSTEM IN GAME APPLICATIONS

(71) Applicant: Tencent Technology (Shenzhen) Company Limited, Shenzhen, Guangdong (CN)

(72) Inventors: Liang Ma, Guangdong (CN); Zhiqiang He, Guangdong (CN); Chunhua Luo, Guangdong (CN); Wen Zhang, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 380 days.

(21) Appl. No.: 15/386,788

(22) Filed: Dec. 21, 2016

(65) Prior Publication Data

US 2017/0100670 A1  Apr. 13, 2017

Related U.S. Application Data

(63) Continuation of application No. PCT/CN2015/082473, filed on Jun. 26, 2015.

(30) Foreign Application Priority Data

Jun. 30, 2014 (CN) .......................... 2014 1 0310445

(51) Int. Cl.
*A63F 13/215* (2014.01)
*A63F 13/49* (2014.01)
(Continued)

(52) U.S. Cl.
CPC ............ *A63F 13/49* (2014.09); *A63F 13/215* (2014.09); *A63F 13/35* (2014.09); *A63F 13/70* (2014.09); *A63F 13/87* (2014.09); *H04L 51/046* (2013.01)

(58) Field of Classification Search
CPC combination set(s) only.
See application file for complete search history.

(56) References Cited

U.S. PATENT DOCUMENTS

| 6,757,531 B1 * | 6/2004 | Haaramo ......... H04M 3/42382 340/7.1 |
| 2002/0110246 A1 * | 8/2002 | Gosior .................... A63F 13/12 381/2 |

(Continued)

FOREIGN PATENT DOCUMENTS

| CN | 1878119 A | 12/2006 |
| CN | 101330434 A | 12/2008 |

(Continued)

OTHER PUBLICATIONS

International Search Report & Written Opinion of the ISA for PCT/CN2015/082473, Haidian District, Beijing, dated Sep. 23, 2015.

*Primary Examiner* — James S. McClellan
*Assistant Examiner* — Kevin M Carter
(74) *Attorney, Agent, or Firm* — Harness, Dickey & Pierce, P.L.C.

(57) ABSTRACT

A voice communication method and system in a game application are provided. The method includes receiving a voice communication instruction in a game process. The voice communication instruction may be a communication identification of a game client that receives voice data. The method also performs voice recording according to the instruction, performs coding and compression processing on the voice data, and sends the voice data that has gone through the coding and compression processing to a corresponding game client.

6 Claims, 8 Drawing Sheets

(51) Int. Cl.
*H04L 12/58* (2006.01)
*A63F 13/35* (2014.01)
*A63F 13/70* (2014.01)
*A63F 13/87* (2014.01)

(56) References Cited

U.S. PATENT DOCUMENTS

| | | | |
|---|---|---|---|
| 2004/0111484 A1* | 6/2004 | Young | A63F 13/10 709/207 |
| 2005/0135333 A1* | 6/2005 | Rojas | H04L 51/04 370/352 |
| 2007/0099637 A1* | 5/2007 | Mangla | H04L 51/04 455/466 |
| 2008/0076471 A1* | 3/2008 | Yuki | H04N 7/142 455/556.1 |
| 2010/0041457 A1 | 2/2010 | Cook et al. | |

FOREIGN PATENT DOCUMENTS

| | | |
|---|---|---|
| CN | 101588280 A | 11/2009 |
| CN | 101989206 A | 3/2011 |
| CN | 103369284 A | 10/2013 |
| CN | 103442051 A | 12/2013 |
| CN | 104052846 A | 9/2014 |
| WO | WO-2016000569 A1 | 1/2016 |

\* cited by examiner

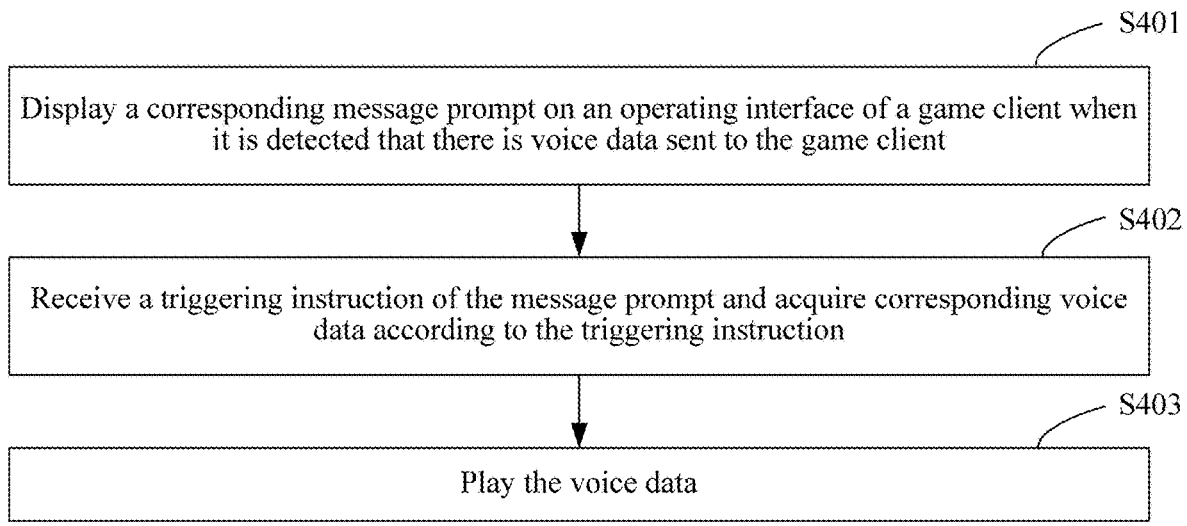

FIG. 3

```
                                                               ┌─ S401
┌──────────────────────────────────────────────────────────────┴──┐
│ Display a corresponding message prompt on an operating interface │
│ of a game client when it is detected that there is voice data   │
│ sent to the game client                                          │
└──────────────────────────────────────────────────────────────────┘
                                │
                                ▼                              ┌─ S402
┌─────────────────────────────────────────────────────────────┴───┐
│ Receive a triggering instruction of the message prompt and      │
│ acquire corresponding voice data according to the triggering    │
│ instruction                                                     │
└─────────────────────────────────────────────────────────────────┘
                                │
                                ▼                              ┌─ S403
┌─────────────────────────────────────────────────────────────┴───┐
│                       Play the voice data                       │
└─────────────────────────────────────────────────────────────────┘
```

FIG. 4

VOICE COMMUNICATION METHOD AND SYSTEM IN GAME APPLICATIONS

CROSS REFERENCE

This application is a continuation of International Application No. PCT/CN2015/082473, filed on Jun. 26, 2015, which claims priority to Chinese Patent Application No. 201410310445.X, filed on Jun. 30, 2014, which is hereby incorporated by reference in their entireties.

FIELD OF THE TECHNOLOGY

The present disclosure relates to the field of instant messaging technologies, and in particular, to a voice communication method in a game application and a voice communication system in a game application.

BACKGROUND OF THE DISCLOSURE

With increasing enhancement of hardware processing capability of mobile terminals, game applications based on the mobile terminals become more and more popular. When social contact is required during game playing, there forms a new interactive need between players: chatting.

With the development of mobile terminal games, players increasingly intend to communication with each other during a game process. At present, in mobile terminal games, and in particular in mobile phone card games, the players chat to each other by inputting text and emoticons. However, for the conventional manner for mutual communication by typing in text on mobile terminals, it takes a long time to complete one communication process because most people are slow in text typing, and the communication efficiency is low.

SUMMARY

In view of the above, embodiments of the present disclosure provide a voice communication method and system in a game application, which can reduce time spent in communication during a game process.

A voice communication method in a game application includes: receiving a voice communication instruction in a game process; the voice communication instruction comprising a communication identification of a game client that receives voice data; performing voice recording according to the voice communication instruction; performing coding and compression processing on voice data obtained by voice recording; and sending the voice data that has gone through the coding and compression processing to a corresponding game client according to the communication identification.

A voice communication method in a game application includes: displaying a corresponding message prompt on an operating interface of a game client in a case that a voice data is sent to the game client; receiving a triggering instruction of the message prompt and acquiring corresponding voice data according to the triggering instruction; and playing the voice data.

A voice communication system in a game application includes a first game client, the first game client including: a communication instruction receiving module, configured to receive a voice communication instruction in a game process, the voice communication instruction comprising a communication identification of a game client that receives voice data; a voice recording module, configured to perform voice recording according to the voice communication instruction; and a coding and transmission module, configured to perform coding and compression processing on voice data obtained by voice recording and send the voice data that has gone through the coding and compression processing to a corresponding game client according to the communication identification.

A voice communication system in a game application includes a second game client, the second game client including: a message prompt displaying module, configured to display a corresponding message prompt on an operating interface of the second game client when detecting that a voice data is sent to the second game client; a voice data downloading module, configured to receive a triggering instruction of the message prompt and acquire corresponding voice data according to the triggering instruction; and a voice playback module, configured to play the voice data.

Another aspect of the present application involves a voice communication system in a game application. The voice communication system includes a first game client and a second game client described above.

In the embodiments of the present disclosure, a manner for communication by text typing in a game process is avoided, the communication objective is implemented in the game process by means of voice inputting with use of less network traffic, more information can be input within the same time, the input speed is faster, time spent in communication in the game process is reduced dramatically, and the communication efficiency in the game process is improved.

BRIEF DESCRIPTION OF THE DRAWINGS

The aforementioned features and advantages of the disclosed embodiments as well as additional features and advantages thereof will be more clearly understood hereinafter as a result of a detailed description of preferred embodiments when taken in conjunction with the drawings. The following briefly describes the accompanying drawings included for describing the embodiments or the prior art. The accompanying drawings in the following descriptions merely show some embodiments, and persons of ordinary skill in the art can derive other drawings from these accompanying drawings without creative efforts.

FIG. 3 illustrates a schematic diagram of an AMR-format file according to an embodiment of the present disclosure;

FIG. 4 illustrates a schematic flowchart of a voice communication method in a game application provided by Embodiment two of the present disclosure;

DESCRIPTION OF EMBODIMENTS

To make the objectives, technical solutions, and advantages of the present disclosure more comprehensible, the present disclosure is further described in detail below with reference to the accompanying drawings and the embodiments. It should be understood that the specific embodiments described herein are only used to explain the present disclosure and do not limit the present disclosure.

Unless the context clearly indicates otherwise, singular elements or components in the present disclosure may be in the plural and vice versa, which is not limited in the present disclosure. Although steps in the present disclosure are labeled with numbers, such numbers are not intended to limit the order of these steps. Unless the order of steps is explicitly stated or it is explicitly stated that a step needs to be performed on the basis of another step, the relative order of steps can be adjusted.

Embodiment One

Figure 1:
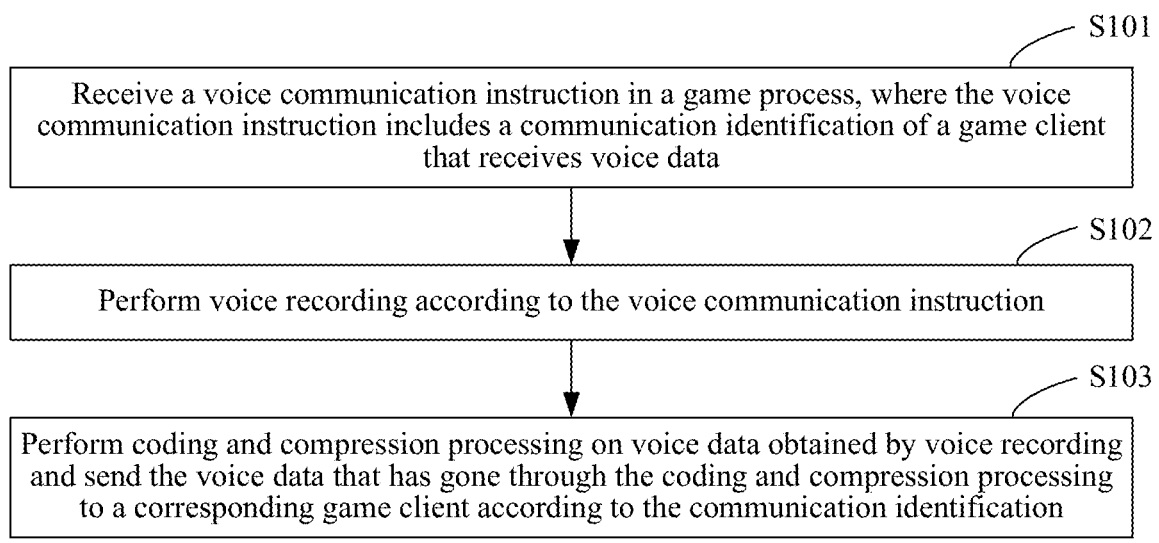
FIG. 1 illustrates a schematic flowchart of a voice communication method in a game application provided by Embodiment one of the present disclosure.

FIG. 1 shows a schematic flowchart of Embodiment one of a voice communication method in a game application of the present disclosure. In Embodiment one, a processing procedure at a sending end is used as an example for description.

As shown in FIG. 1, in the Embodiment one, the processing procedure at the sending end includes:

S101: Receive a voice communication instruction in a game process, where the voice communication instruction includes a communication identification of a game client that receives voice data.

S102: Perform voice recording according to the voice communication instruction.

S103: Perform coding and compression processing on voice data obtained by voice recording, and send the voice data that has gone through the coding and compression processing to a corresponding game client according to the communication identification.

In a conventional communication method in a game application, a text dialog box pops up when a communication instruction is received; text or an emoticon entered by a user is acquired from the text dialog box and is then sent to anther user that participates in the game at present. However, in this embodiment of the present disclosure, an audio dialog box pops up after a communication instruction is received, and bilateral or multilateral communication is implemented by voice recording.

It should be noted that before voice recording, it is first required to create a voice channel, that is, prepare a device context ambient needed by voice recording, for example, setting a voice channel sampling frequency, or setting a voice recording channel and a data bit occupied by each channel. The voice recording can be performed after the ambient variants are set. In this embodiment of the present disclosure, a sampling frequency value sampleRate (code rate) may be set to 44100, values of audio channels may be set to 1, and a value of bytes transmitted by each channel (bitperchannel) may be set to 16.

Specifically, in one of the embodiments, the process of performing voice recording in S102 may specifically include:

S1021: Detect a current memory status of a game client in real time and create several voice recording buffers according to the memory status.

A difference between a buffering and callback mechanism in the existing technology and that in this embodiment of the present disclosure lies in that, the number of the buffers is not a static value in this embodiment of the present disclosure, but can be adjusted dynamically according to different performance of the game client or the size of memory currently used by the game client. For example, during creation of voice recording buffers, the number of the created buffers may reduce dynamically when it is read that the memory of the game client is below a certain threshold. For example, when the memory is below 100 M, at most three buffers are created, and the number of the created buffers may be adjusted to six when the memory is higher than 100 M. In this way, a probability that a program is killed by the system when being switched to a background is reduced. By using an Android mobile phone as an example, in an android system, if a program applies for a quite large buffer when memory of the mobile phone is quite low, the program will be killed after being switched to the background, so as to release memory to other applications for use.

S1022: Turn on a microphone or another voice recording device according to the communication instruction to perform voice recording, and store recorded voice data in the voice recording buffers.

In this embodiment of the present disclosure, the voice data obtained by voice recording may be Pulse Code Modulation (PCM) data.

S1023: After it is detected that one voice recording buffer is full, write voice data of the full buffer into a local magnetic disk and continuously write voice data into a next voice recording buffer.

In a conventional method, data in buffers is mostly selected to be buffered in memory. However, in this embodiment of the present disclosure, the voice data is buffered in the local magnetic disk, and in this way, data loss is avoided even if a program crashes in the recording process.

It should be noted that the local magnetic disk is a secure digital memory card (SD card) when the game client in this embodiment of the present disclosure is a mobile phone.

S1024: After it is detected that all voice data in the full buffer is written into the local magnetic disk, reclaim the full buffer to continuously receive new voice data until the voice recording is finished.

Figure 2:
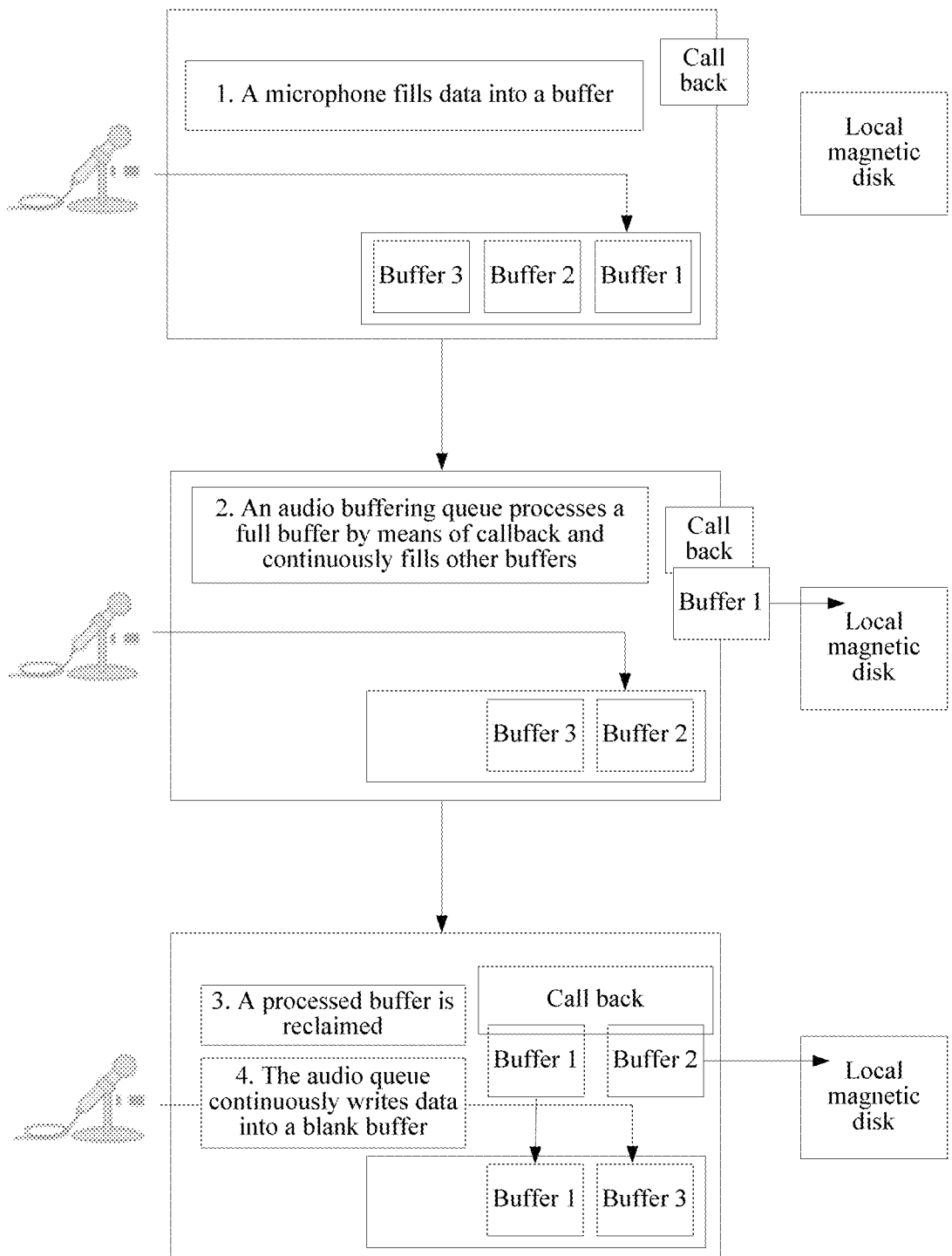
FIG. 2 illustrates schematic diagram of a voice recording mechanism according to an embodiment of the present disclosure.

As shown in FIG. 2, in one of the embodiments, the voice recording mechanism in this embodiment of the present disclosure is described by creating three voice recording buffers:

1) Upon creation of three voice recording buffers, a microphone (Microphone) is turned on to enable a recording function of a system. After the first buffer is full, an upper-layer application layer is notified in a callback form, and data in the buffers is then stored in a local magnetic disk.

2) Data is continuously written into the remaining two buffers after one is full.

3) If callback ends after the upper layer finishes processing of the data in the first buffer and writes the data back to the local magnetic disk, the first buffer is reclaimed by the system and may be continuously used to receive data.

4) The foregoing three steps are repeated until recording of voice data of a user is finished.

It should be noted that during voice recording in this embodiment of the present disclosure, there are following matters needing attention:

1) Voice recording is started when a voice recording key is clicked during the game.

2) Transmission is not performed either when it is detected that a speech is excessively short, or when the user says nothing within a short time (clicking by mistake).

3) The longest time of voice recording is limited to 5 seconds with the reason that the volume of recorded data within 5 seconds may not exceed 1 K and the user may transmit the data to a server by using a small amount of traffic. If the voice recording time is excessively long, a high transmission cost is required, and if the voice recording time is excessively short, it is insufficient for a game player to express a complete meaning. After a compromise, an intermediate value, that is, 5 seconds, is used.

4) Other sound effects in the game are shielded during the voice recording.

5) The level of volume needs to be indicated graphically during the voice recording.

6) Recording time is indicated during the voice recording.

7) Uploading needs to be performed along with recording during the voice recording.

In addition, in one of the embodiments, the process, in S103, of performing coding and compression processing on voice data obtained by voice recording may specifically include:

S1031: Add set codes at a head and a tail of the voice data as tags for indicating transmission start and end.

S1032: Acquire a sampling frequency value, a channel value, and a channel bit value of the voice data.

S1033: Perform coding and compression of an adaptive multi-rate narrow band (AMR-NB) format on the voice data according to the tags, the sampling frequency value, the channel value, and the channel bit value, to obtain AMR-NB data, and store the AMR-NB data in the local magnetic disk in the form of a file.

An AMR coding mode may be distinguished by using a frame header of each frame in the AMR data. A higher code rate indicates better quality. Each frame of the AMR data is 20 ms. For AMR12.2, each frame occupies 12.2*1000/50/8=30.5 bytes, and by adding 1 byte of the frame header, each frame is rounded off to 32 bytes. The AMR12.2 is twice of the AMR5.15.

An AMR file format is as follows:

| magic | frame 1 | frame 2 | frame 3 | ... |

FIG. 3 shows an example in which a magic number (magic numbers: some random numbers without actual meanings) of the AMR is: #!AMR\n. All AMR files are headed by the six bytes. An AMR frame includes a frame header and frame content. The frame header indicates the coding mode and the size of the frame. The AMR-NB has 8 coding modes, as shown in the table below:

|   | Specification | Bit rate (kbps) | Audio frame size (byte) | Frame header (byte) |
|---|---|---|---|---|
| 0 | AMR 4.75 | 4.75 | 13 | 04 00000100 |
| 1 | AMR 5.15 | 5.15 | 14 | 0C 00001100 |
| 2 | AMR 5.9 | 5.9 | 16 | 14 00010100 |
| 3 | AMR 6.7 | 6.7 | 18 | 1C 00011100 |
| 4 | AMR 7.4 | 7.4 | 20 | 24 00100100 |
| 5 | AMR 7.95 | 7.95 | 21 | 2C 00101100 |
| 6 | AMR 10.2 | 10.2 | 27 | 34 00110100 |
| 7 | AMR 12.2 | 12.2 | 32 | 3C 00111100 |

For example, if a frame header in an AMR file is 3C, it can be known that the used coding mode is AMR12.2, the frame size is 32 bytes, and the voice data is 31 bytes. In one of the embodiments, whether to use a low-rate or a high-rate AMR can be determined according to a user network situation, and conversion is performed by using AMR-coded C codes, so that the code rate can be controlled.

The AMR coding is classified into two types, namely, AMR-NB and Adaptive Multi-Rate Wide Band (AMR-WB). The difference between the two types lies in that the AMR-NB has a voice bandwidth range of 300 to 3400 Hz and uses 8 KHz sampling, and the AMR-WB has a voice bandwidth range of 50 to 7000 Hz and uses 16 KHz sampling. In this embodiment of the present disclosure, the AMR-NB coding is used because the data packet amount of the AMR-NB saves more space as compared with the AMR-WB.

The AMR-NB uses the 8 k sampling rate, and the length of each frame of the AMR is 0.02 s. If the sampling rate of the PCM is also 8 k and a single channel is 16 bits, the PCM data amount under 0.02 s is: 0.02*8000*16/8=320 bytes. It can be seen that the PCM data is tenth of that of the AMR format, that is, a compression rate in this embodiment of the present disclosure may reach 10:1. By performing network transmission by using the AMR-format data in this embodiment of the present disclosure, network traffic is effectively saved.

As a preferred embodiment, to further save network traffic, after the coding the voice data into AMR-NB data in S1033, the method may further include:

determining whether a capacity of the AMR-NB data is greater than a set threshold; and performing secondary coding and compression of a Java Cryptography Extension (JCE) format on the AMR-NB data if the capacity of the AMR-NB data is greater than the set threshold, to obtain JCE data, and send the JCE data to a corresponding game client according to the communication identification.

JCE is a self-defined protocol format, which defines a protocol structure and a remote object interface. A JCE file uses .jce as an extension name, may automatically generate a protocol coding/decoding codes (c/c++, java, kjava, symbian, and mtk), defines the structure, and may support an extension field, that is, may add a field without affecting parsing of the original structure (protocol extension support).

Each piece of JCE data is composed of two parts: header information and actual data. The header information further includes several parts shown in the table below:

| Type | Tag 1 | Tag 2 |
|---|---|---|
| (4 bits) | (4 bits) | (1 bit) |

Type in the foregoing table indicates the type, is represented by 4 binary digits with a value range of 0 to 15, and is used to identify the type of the data. The length and the format of actual data following the data of different types are different. In addition, Tag is indicated by Tag 1 and Tag 2 with a value range of 0 to 255, which is a field ID of the data in the structure, and is used for distinguishing different fields. It should be noted that Tag 2 in the foregoing table is optional. When the value of Tag does not exceed 14, only Tag 1 is needed for expression. When the value of Tag exceeds 14 but is less than 256, Tag 1 is fixed to 15 and Tag 2 is used to indicate the value of Tag. Tag is not allowed to be greater than 255.

Through data measurement, by performing secondary compression processing by using the JCE format in this embodiment of the present disclosure, 20% of data transmission amount is reduced as compared with the original coding format, and thus network data traffic is further saved, the success rate is improved, the implementation efficiency is high, and the algorithm complexity is low.

Embodiment Two

FIG. 4 shows a schematic flowchart of Embodiment two of a voice communication method in a game application of the present disclosure. In Embodiment two, a processing procedure at a receiving end is used as an example for description.

As shown in FIG. 4, in Embodiment two, the processing procedure at the receiving end includes:

S401: Display a corresponding message prompt on an operating interface of a game client when it is detected that there is voice data sent to the game client.

S402: Receive a triggering instruction of the message prompt and acquire corresponding voice data according to the triggering instruction.

S403: Play the voice data.

In one of the embodiments, after the acquiring the voice data and before playing the voice data, the method further includes:

storing the voice data in a local magnetic disk of the game client and determining whether it is necessary to perform decoding processing on the voice data; and performing decoding processing on the voice data if it is necessary to perform decoding processing on the voice data.

Audio formats supported by different game client platforms are different. For example, an Android mobile phone may directly play data of an AMR format, while IOS6.0 only supports voice data of a PCM format. Therefore, whether to perform decoding processing needs to be determined according to an audio format supported by a game client. For a game client that supports both the AMR and the PCM, decoding is not needed and data is played directly. For a game client that does not support the AMR format, it is necessary to decode the data into PCM data and then play the data.

As a preferred embodiment, the process, in S403, of playing the voice data specifically may include:

S4031: Detect a current memory status of a game client in real time and create several voice recording buffers according to the memory status.

S4032: Load the voice data in the local magnetic disk of the game client to the voice playback buffers, and after it is detected that all the voice playback buffers are full, transmit the voice data in the voice playback buffers to a loudspeaker or another voice playback device for voice playback.

S4033: When it is detected that playback of voice data in one voice playback buffer is finished, play voice data in a next voice playback buffer until playback of voice data in all the voice playback buffers is finished.

S4034: Perform callback when it is detected that playback of the voice data in all the voice playback buffers is finished, and subsequently write voice data until playback of all voice data is finished.

Figure 5:
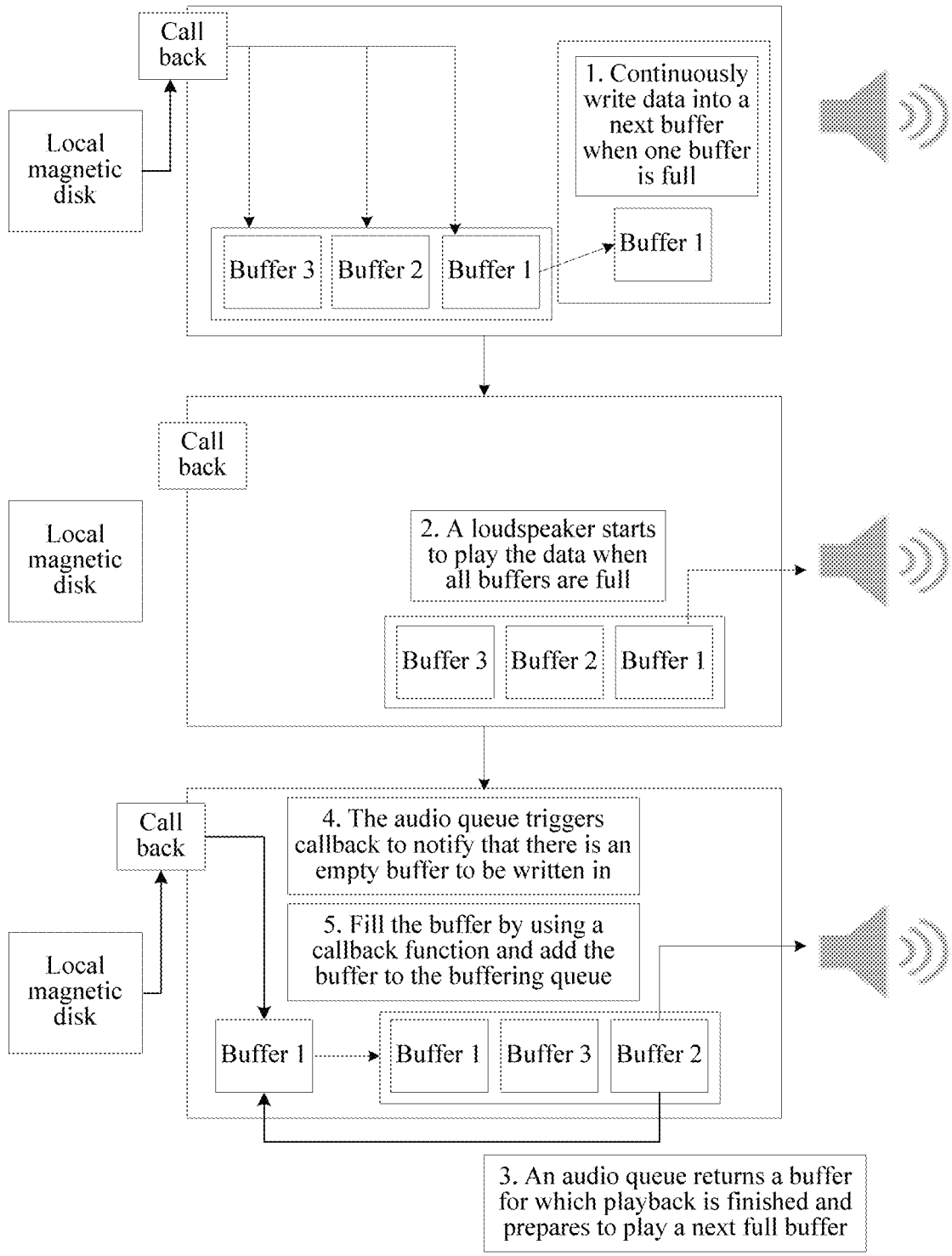
FIG. 5 illustrates a schematic diagram of a voice playback mechanism according to an embodiment of the present disclosure.

As shown in FIG. 5, in one of the embodiments, the voice playback mechanism in this embodiment of the present disclosure is described by creating three voice playback buffers:

1) The voice data stored in the local magnetic disk is loaded to the created buffers and the voice data in the buffers can be transmitted to the loudspeaker for playback after the three buffers are full.

2) After finishing playback of voice data in one buffer, data of a second buffer is processed until processing of the data in the three buffers is finished.

3) Callback is performed each time data of the three buffers is processed, and subsequently data is written into the buffers.

4) The foregoing three steps are repeated until playback of all the voice data is finished.

By using a card game as an example, when receiving voice data and performing voice playback in this embodiment of the present disclosure, there are following matters needing attention:

1) A game player receives a voice message, a message prompt for informing that there comes a voice, the voice data may be downloaded automatically in a wifi environment and is not automatically downloaded in a non-wifi environment. That is, in this embodiment of the present disclosure, there first shows a message prompt for informing that there comes a voice and at the same time the voice data is downloaded in the wifi environment, instead of showing a message prompt after downloading is finished.

2) If the voice data is not downloaded when the voice is clicked for playback, the voice is played at the same time when downloading is performed, instead of playing the voice when a certain amount of buffered data is saved after downloading is finished.

3) During the voice playback, if downloading of voice data is interrupted due to a network problem and playback of data downloaded previously is finished, playback is suspended and downloading is retried; and if downloading fails after retrying is performed twice, prompt the player with a message that "Please check whether your network is normal".

4) Give a prompt by using a special sound when it is detected that there is voice data sent thereto.

5) The message prompt vanishes automatically after 5 seconds or after the clicking for playback.

6) The length of the voice may be shown in a digital form.

7) During voice playback, a distance between the game client and human ears is detected automatically; when the distance is large, the loudspeaker is used automatically for voice playback, and when the distance is short, an earphone may be used.

8) Volume needs to be recovered during voice playback to show the volume of a voice recorded at a certain time.

In one of the embodiments, the following formula may be used for volume recovery:

$$\left\{ \sqrt{\sum_{j=1}^{n} [(Vj_1)^2 + (Vj_2)^2 \ldots + (Vj_n)^2]/2} \right\} / 4096.$$

In the formula, Vj1, Vj2, . . . , and Vjn represent voice data of each voice frame. By using the foregoing volume recovery algorithm, the volume of a voice recorded at a certain time may be shown more accurately by calculating a volume percentage.

Embodiment Three

Figure 6:
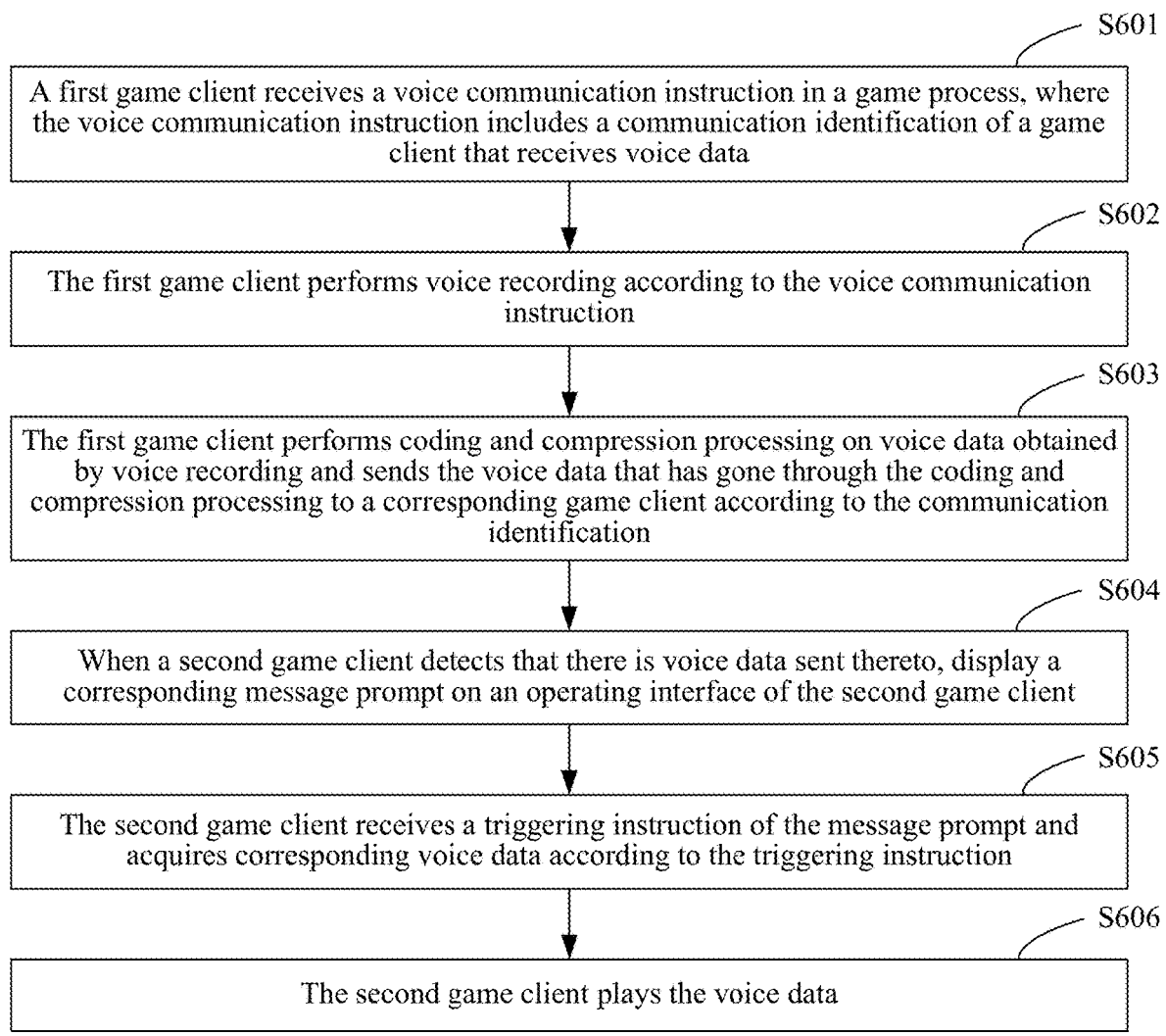
FIG. 6 illustrates a schematic flowchart of a voice communication method in a game application provided by Embodiment three of the present disclosure.

With reference to the solutions of the foregoing Embodiment one and Embodiment two, FIG. 6 shows a schematic flowchart of Embodiment three of a voice communication method in a game application of the present disclosure. In this embodiment, a whole process implemented by a sending end and a receiving end during voice communication is used as an example for description. Such description does not constitute a limitation to the solutions of the present disclosure.

As shown in FIG. 6, in Embodiment three, the voice communication method in a game application of the present disclosure includes:

S601: A first game client (that is, the sending end) receives a voice communication instruction in a game process, where the voice communication instruction includes a communication identification of a game client that receives voice data.

S602: The first game client performs voice recording according to the voice communication instruction.

S603: The first game client performs coding and compression processing on voice data obtained by voice recording and sends the voice data that has gone through the coding and compression processing to a corresponding game client according to the communication identification.

S604: When a second game client (that is, the receiving end) detects that there is voice data sent thereto, display a corresponding message prompt on an operating interface of the second game client.

S605: The second game client receives a triggering instruction of the message prompt and acquires corresponding voice data according to the triggering instruction.

S606: The second game client plays the voice data.

In one of the embodiments, the process, in S603, of sending the voice data that has gone through the coding and compression processing to a corresponding game client may specifically include that: the first game client sends the voice data that has gone through the coding and compression processing to a server and the server forwards the voice data to the corresponding game client.

In the solutions of this embodiment of the present disclosure, a Model View Controller (MVC) design architecture may be used, voice recording and playing are separated from voice coding and decoding, which achieves high implementation efficiency, and low algorithm complexity. Moreover, a difference at a bottom layer may be shielded by using a platform interface layer and an application framework layer, and a uniform application public module is provided for an upper layer. In this manner, it is unnecessary to learn about whether voice recording is run on an Android or IOS platform, because uniform implementation is performed at the bottom layer. Simultaneous transmission to a plurality of mobile terminals can be implemented, cross-platform running may be implemented, one set of schemes covers a plurality of platforms, and one architecture design manner implements a cross-platform, integral scheme. As compared with conventional solutions in which each platform individually implements voice communication, the process in the solutions of this embodiment of the present disclosure is more concise. By using a voice recording framework in this embodiment of the present disclosure, a plurality of platforms such as iOS, Android, Symbian, Win32, WP7, Bada, and iMac can be covered. One same project only needs to be developed once by one developing team, and versions for all of the foregoing platforms can be output.

Other technical features of the voice communication method in the game application in this embodiment are the same as those of Embodiment one and Embodiment two of the present disclosure, which are not described again herein.

According to the voice communication method in the game application, this embodiment of the present disclosure also provides a voice communication system in a game application. The voice communication system in a game application of the present disclosure may only include one of a sending end and a receiving end or may also include both a sending end and a receiving end. To facilitate description, FIG. 7 shows a schematic structural diagram of an embodiment of a voice communication system in a game application of the present disclosure with reference to a sending end and a receiving end.

Figure 7:
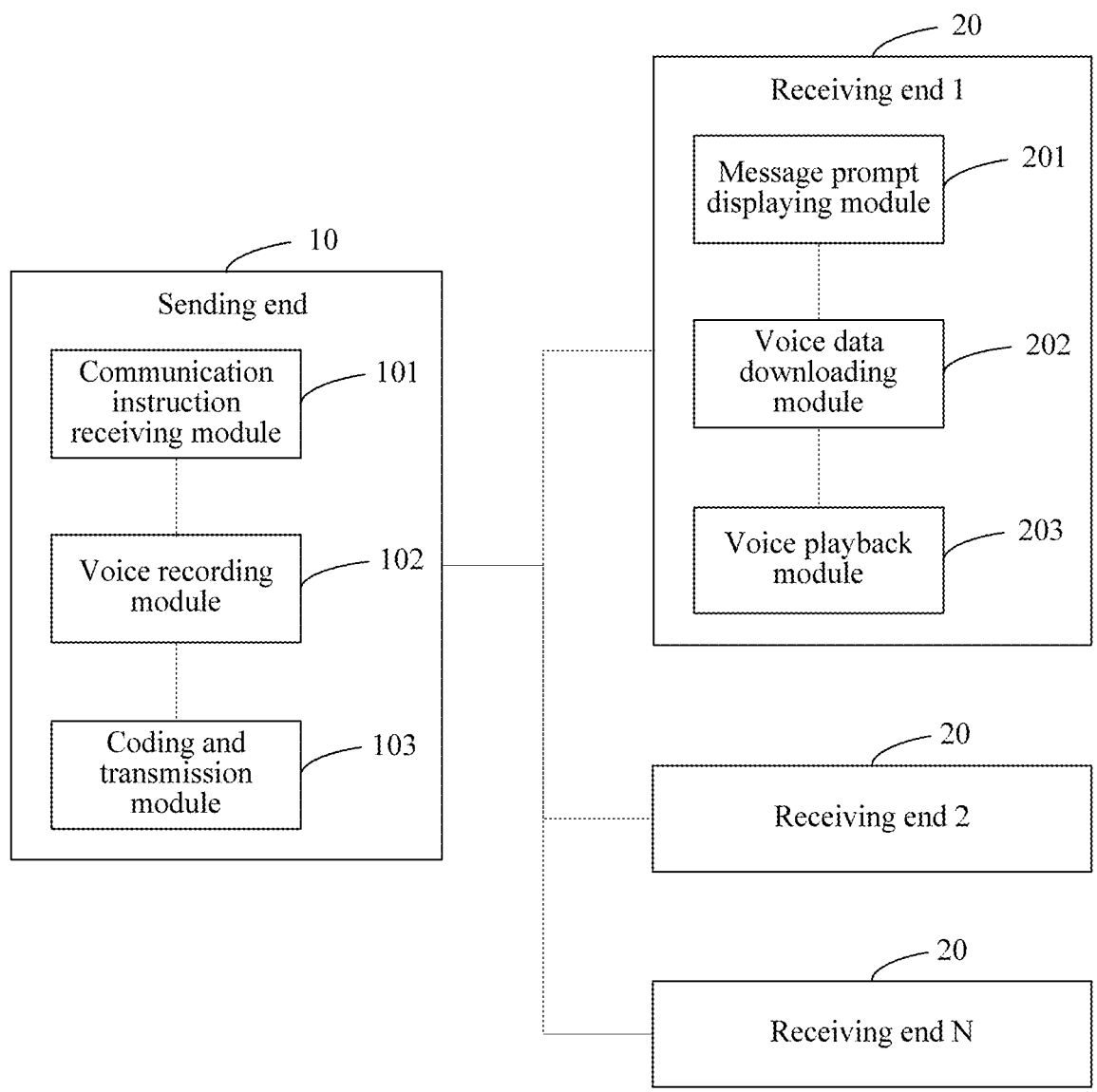
FIG. 7 illustrates a schematic structural diagram of a voice communication system in a game application according to an embodiment of the present disclosure.

As shown in FIG. 7, the voice communication system in the game application in this embodiment includes a first game client 10. The first game client is the sending end. Specifically, the first game client 10 includes:

a communication instruction receiving module 101, configured to receive a voice communication instruction in a game process, where the voice communication instruction includes a communication identification of a game client that receives voice data;

a voice recording module 102, configured to perform voice recording according to the voice communication instruction; and a coding and transmission module 103, configured to perform coding and compression processing on voice data obtained by voice recording and send the voice data that has gone through the coding and compression processing to a corresponding game client according to the communication identification.

In one of the embodiments, the voice recording module may include:

a voice recording buffer creating module, configured to detect a current memory status of a first game client in real time and create several voice recording buffers according to the memory status;

a buffer writing module, configured to turn on a microphone according to the communication instruction to perform voice recording, and store recorded voice data in the voice recording buffers;

a local magnetic disk writing module, configured to write, after it is detected that one voice recording buffer is full, voice data of the full buffer into a local magnetic disk and continuously write voice data into a next voice recording buffer; and a reclaiming module, configured to reclaim, after it is detected that all voice data in the full buffer is written into the local magnetic disk, the full buffer to continuously receive new voice data until the voice recording is finished.

In one of the embodiments, the coding and transmission module may include:

a marking module, configured to add set codes at a head and a tail of the voice data as tags for indicating transmission start and end;

an acquiring module, configured to acquire a sampling frequency value, a channel value, and a channel bit value of the voice data; and an AMR coding module, configured to perform coding and compression of an AMR-NB format on the voice data according to the tags, the sampling frequency value, the channel value, and the channel bit value, to obtain AMR-NB data, and store the AMR-NB data in the local magnetic disk in the form of a file.

In one of the embodiments, the coding and transmission module may further include:

a first determining module, configured to determine whether a capacity of the AMR-NB data is greater than a set threshold; and a JCE coding and sending module, configured to perform, if a determining result of the first determining module is yes, secondary coding and compression of a JCE format on the AMR-NB data, to obtain JCE data, and send the JCE data to the corresponding game client according to the communication identification.

In addition, the voice communication system in the game application in this embodiment may further include a second game client. The second game client is the receiving end. As shown in FIG. 7, the second game client 20 includes:

a message prompt displaying module 201, configured to display a corresponding message prompt on an operating interface of the second game client when it is detected that there is voice data sent to the second game client;

a voice data downloading module 202, configured to receive a triggering instruction of the message prompt and acquire corresponding voice data according to the triggering instruction; and a voice playback module 203, configured to play the voice data.

In one of the embodiments, the second game client may further include:

a second determining module, configured to store the voice data in a local magnetic disk of the second game client and determine whether it is necessary to perform decoding processing on the voice data; and a decoding module, configured to perform decoding processing on the voice data in a case in which a determining result of the second determining module is yes.

In one of the embodiments, the voice playback module may include:

a voice playback buffer creating module, configured to detect a current memory status of the second game client in real time and create several voice playback buffers according to the memory status;

a loading and transmission module, configured to load the voice data in the local magnetic disk of the second game client to the voice playback buffers, and transmit the voice data in the voice playback buffers to a loudspeaker for voice playback after it is detected that all the voice playback buffers are full;

a sequential playing module, configured to play, when it is detected that playback of voice data in one voice playback buffer is finished, voice data in a next voice playback buffer until playback of voice data in all the voice playback buffers is finished; and a callback module, configured to perform callback when it is detected that playback of the voice data in all the voice playback buffers is finished, and subsequently write voice data until playback of all voice data is finished.

Figure 8:
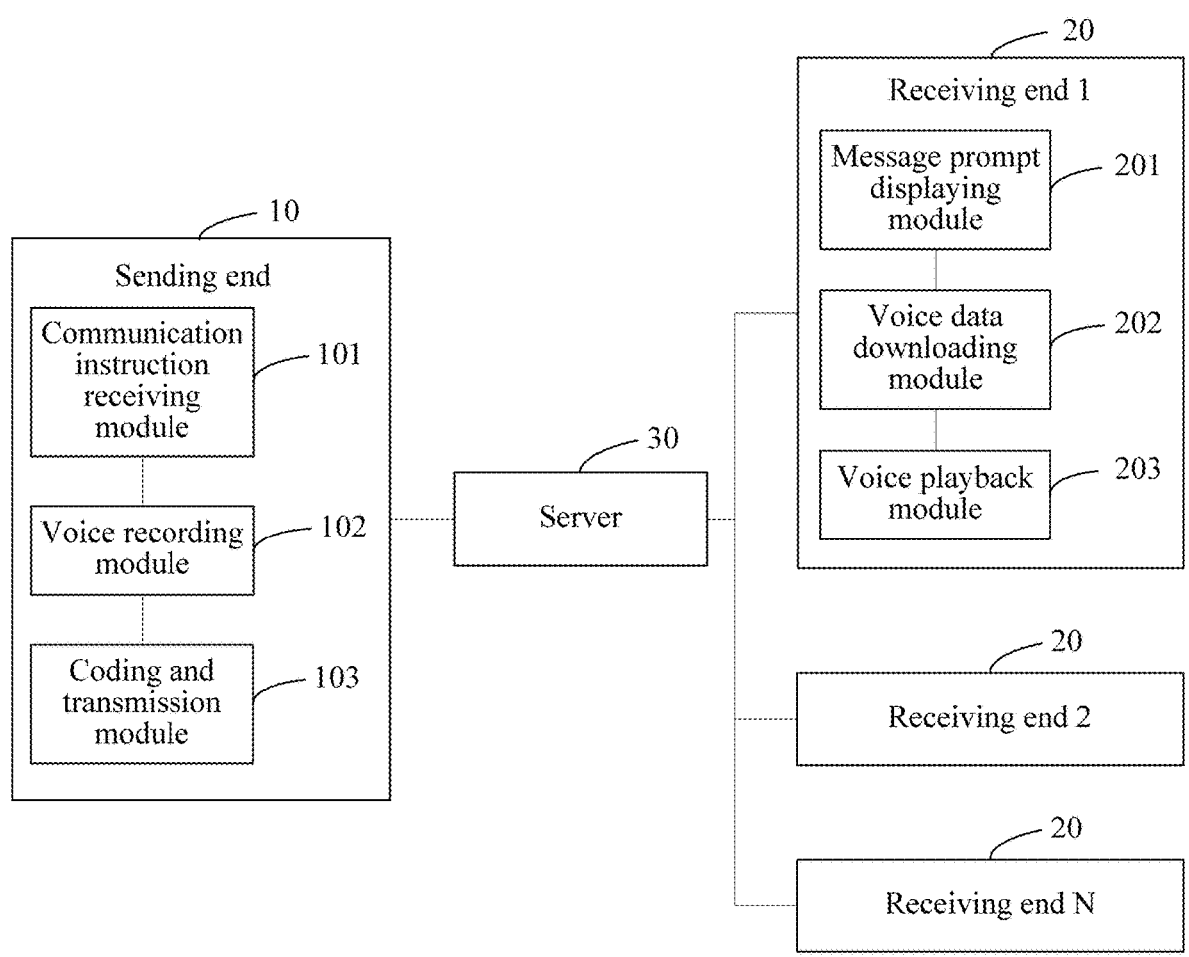
FIG. 8 illustrates a schematic structural diagram of a voice communication system in a game application according to another embodiment of the present disclosure.

In one of the embodiments, as shown in FIG. 8, the voice communication system in the game application in this embodiment of the present disclosure may further include a server 30.

The server 30 is configured to receive voice data sent from the first game client 10 and forward the voice data to the corresponding second game client 20.

Other technical features of the voice communication system in the game application are the same as those of the voice communication method in the game application in the embodiments of the present disclosure, which are not described again herein.

Figure 9:
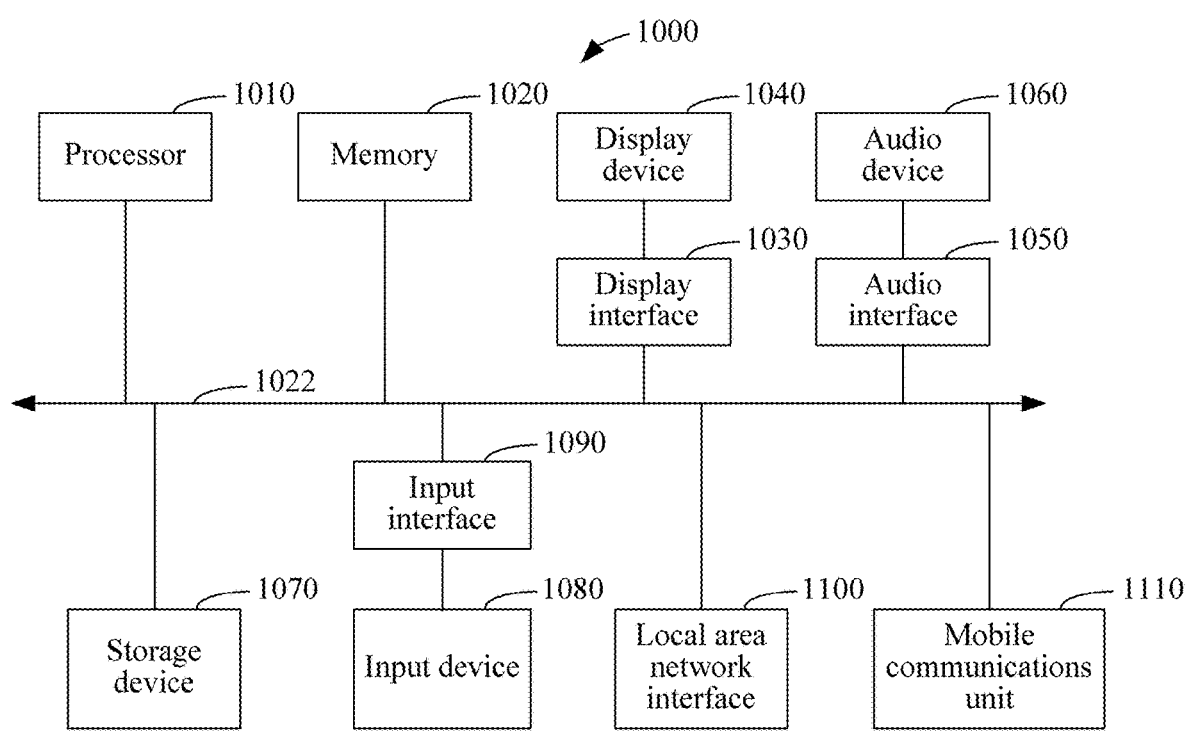
FIG. 9 illustrates a schematic structural diagram of a computer system according to an embodiment of the present disclosure.

FIG. 9 is a block diagram of a computer system 1000 that can implement the embodiments of the present disclosure. The computer system 1000 is merely an example of a computer system environment applicable to the present disclosure, and should not be construed as any limitation on the application scope of the present disclosure. The computer system 1000 also should not be interpreted as needing to rely on or have one or a combination of parts of the exemplary computer system 1000 shown in FIG. 9.

The computer system 1000 shown in FIG. 9 is an example of computer systems suitable for use in the present disclosure. Other architectures having different subsystem configurations may also be used. For example, well-known devices such as a notebook computer, a personal digital assistant, a smart phone, a tablet computer, a portable media player, and a set-top box are applicable to some embodiments of the present disclosure, but the present disclosure is not limited thereto.

As shown in FIG. 9, the computer system 1000 includes a processor 1010, a memory 1020, and a system bus 1022. Various system components including the memory 1020 and the processor 1010 are connected to the system bus 1022. The processor 1010 is hardware for executing computer program instructions by means of basic arithmetic and logic operations in the computer system. The memory 1020 is a physical device for temporarily or permanently storing computer programs or data (for example, program state information). The system bus 1022 may be any one of the following types of bus structures: a memory bus or memory controller, a peripheral bus and a local bus. The processor 1010 and the memory 1020 can perform data communication through the system bus 1022. The memory 1020 includes a read-only memory (ROM) or a flash memory (both not shown), and a random access memory (RAM), where the RAM generally refers to main memory loaded with an operating system and application programs.

The computer system 1000 further includes a display interface 1030 (for example, a graphics processing unit), a display device 1040 (for example, a liquid crystal display), an audio interface 1050 (for example, a sound card) and an audio device 1060 (for example, a loudspeaker). The display device 1040 and the audio device 1060 are media devices for presenting multimedia content.

The computer system 1000 generally includes one storage device 1070. The storage device 1070 may be selected from multiple types of computer readable media. The computer readable media refer to any available media that can be accessed by the computer system 1000, and include removable media and non-removable media. For example, the computer readable media include, but not limited to, a flash memory (micro SD card), a CD-ROM, a digital versatile disc (DVD) or other optical storage, a cassette, a magnetic tape, a disk storage or other magnetic storage devices, or any other media that can be used to store required information and can be accessed by the computer system 1000.

The computer system 1000 further includes an input device 1080 and an input interface 1090 (for example, an IO controller). A user may input an instruction and information into the computer system 1000 by using the input device 1080, such as a keyboard, a mouse or a touch panel device on the display device 1040. The input device 1080 is generally connected to the system bus 1022 through the input interface 1090, but may also be connected through other interfaces or bus structures, such as a universal serial bus (USB).

The computer system 1000 may be logically connected to one or more network devices in a network environment. The network device may be a personal computer, a server, a router, a smart phone, a tablet computer or other public network nodes. The computer system 1000 is connected to the network device through a local area network (LAN) interface 1100 or a mobile communications unit 1110. A local area network (LAN) refers to an interconnected computer network in a limited area such as a family, a school, a computer laboratory, or an office building using network media. WiFi and Ethernet over twisted pair are the most commonly used two technologies for building a local area network. WiFi is a technology that enables the computer systems 1000 to exchange data or to be connected to a wireless network through radio waves. The mobile communications unit 1110 is capable of making and receiving calls through radio communications lines while moving in a broad geographic area. In addition to calling, the mobile communications unit 1110 also supports Internet access in a 2G, 3G or 4G cellular communications system that provides mobile data services.

It should be noted that other computer systems including more or fewer subsystems than those of the computer system 1000 are also applicable to the present disclosure. For example, the computer system 1000 may include a Bluetooth unit capable of exchanging data in a short distance, an image sensor for capturing images, and an accelerometer for measuring the acceleration.

As described above in detail, the computer system 1000 applicable to the present disclosure can execute specified operations in the voice communication method in the game application. The computer system 1000 executes these operations in the form of running software instructions in the computer readable media by the processor 1010. These software instructions may be read into the memory 1020 from the storage device 1070 or from another device through the local area network interface 1100. The software instructions stored in the memory 1020 enable the processor 1010 to execute the voice communication method in the game application. Moreover, the present disclosure may also be implemented by using a hardware circuit or by using a combination of a hardware circuit and software instructions. Therefore, the implementation of the present disclosure is not limited to any particular combination of a hardware circuit and software.

It can be seen from the foregoing solutions that by using the voice communication method and system in the game application, when communication is needed in a game process, voice recording is performed according to a voice communication instruction, coding and compression processing is performed, and voice data that has gone through the coding and compression processing is sent to a corresponding game client according to a communication identification, to implement voice playback. In the present disclosure, a manner for communication by text typing in a game process is avoided, the communication objective is implemented in the game process by means of voice inputting with use of less network traffic, more information can be input within the same time, the input speed is faster, time spent in communication in the game process is reduced dramatically, and the communication efficiency in the game process is improved.

The sequence numbers of the above embodiments of the disclosure are only for the purpose of description, and do not represent one embodiment is superior to another.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A voice communication method in a game application, comprising:
   receiving a voice communication instruction in a game process; the voice communication instruction comprising a communication identification of a game client that receives voice data;
   performing voice recording according to the voice communication instruction;
   performing coding and compression processing on voice data obtained by voice recording; and
   sending the voice data that has gone through the coding and compression processing to a corresponding game client according to the communication identification,
   wherein the performing coding and compression processing on voice data obtained by voice recording comprises:
   adding set codes at a head and a tail of the voice data as tags for indicating transmission start and end;
   acquiring a sampling frequency value, a channel value, and a channel bit value of the voice data; and
   performing coding and compression of an adaptive multi-rate narrow band (AMR-NB) format on the voice data according to the tags, the sampling frequency value, the channel value, and the channel bit value, to obtain AMR-NB data, and storing the AMR-NB data in the local magnetic disk in the form of a file.

2. The method according to claim 1, wherein the performing voice recording comprises:
   detecting a current memory status of the game client in real time and creating several voice recording buffers according to the memory status;
   turning on a microphone according to the communication instruction to perform voice recording, and storing recorded voice data in the voice recording buffers;
   writing, after detecting that one voice recording buffer is a full buffer, voice data of the full buffer into a local magnetic disk and continuously writing voice data into a next voice recording buffer; and
   reclaiming, after detecting that all voice data in the full buffer is written into the local magnetic disk, the full buffer to continuously receive new voice data until the voice recording is finished.

3. The method according to claim 1, wherein the sending the voice data that has gone through the coding and compression processing to a corresponding game client according to the communication identification comprises:
   determining whether a capacity of the AMR-NB data is greater than a set threshold; and
   performing, if the capacity of the AMR-NB data is greater than the set threshold, secondary coding and compression of a Java Cryptography Extension (JCE) format on the AMR-NB data, to obtain JCE data, and sending the JCE data to the corresponding game client according to the communication identification.

4. A voice communication system in a game application, comprising a first game client, the first game client comprising:
   a communication instruction receiving module, configured to receive a voice communication instruction in a game process, the voice communication instruction comprising a communication identification of a game client that receives voice data;

a voice recording module, configured to perform voice recording according to the voice communication instruction; and a coding and transmission module, configured to perform coding and compression processing on voice data obtained by voice recording and send the voice data that has gone through the coding and compression processing to a corresponding game client according to the communication identification, wherein the coding and transmission module comprises:

a marking module, configured to add set codes at a head and a tail of the voice data as tags for indicating transmission start and end;

an acquiring module, configured to acquire a sampling frequency value, a channel value, and a channel bit value of the voice data; and an adaptive multi-rate (AMR) coding module, configured to perform coding and compression of an adaptive multi-rate narrow band (AMR-NB) format on the voice data according to the tags, the sampling frequency value, the channel value, and the channel bit value, to obtain AMR-NB data, and store the AMR-NB data in the local magnetic disk in the form of a file.

5. The system according to claim 4, wherein the voice recording module comprises:

a voice recording buffer creating module, configured to detect a current memory status of a first game client in real time and create several voice recording buffers according to the memory status;

a buffer writing module, configured to turn on a microphone according to the communication instruction to perform voice recording, and store recorded voice data in the voice recording buffers;

a local magnetic disk writing module, configured to write, after detecting that one voice recording buffer is a full buffer, voice data of the full buffer into a local magnetic disk and continuously write voice data into a next voice recording buffer; and a reclaiming module, configured to reclaim, after detecting that all voice data in the full buffer is written into the local magnetic disk, the full buffer to continuously receive new voice data until the voice recording is finished.

6. The system according to claim 4, wherein the coding and transmission module further comprises:

a first determining module, configured to determine whether a capacity of the AMR-NB data is greater than a set threshold; and a Java Cryptography Extension (JCE) coding and sending module, configured to perform, if a determining result of the first determining module is yes, secondary coding and compression of a JCE format on the AMR-NB data, to obtain JCE data, and send the JCE data to the corresponding game client according to the communication identification.

* * * * *